P. G. BOGDANOFF.
SPLIT LUBRICATING BEARING FOR SHAFTS, ETC.
APPLICATION FILED NOV. 10, 1919.
1,421,661.
Patented July 4, 1922.
2 SHEETS—SHEET 1.
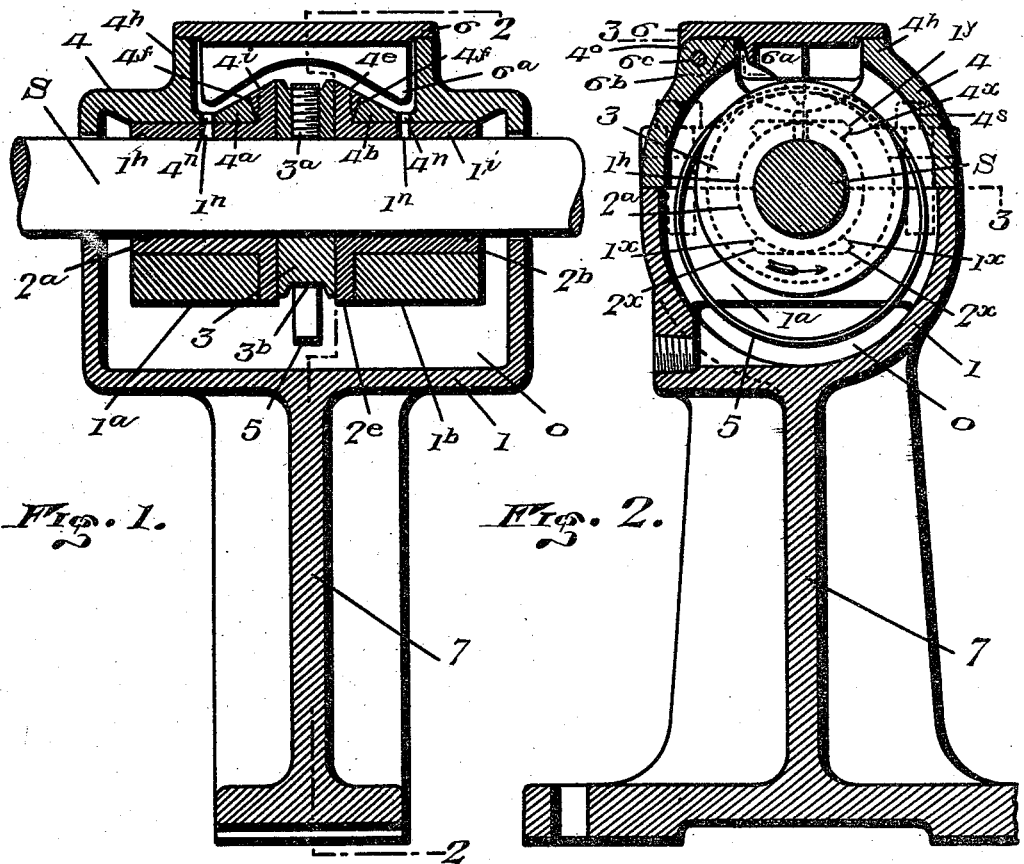
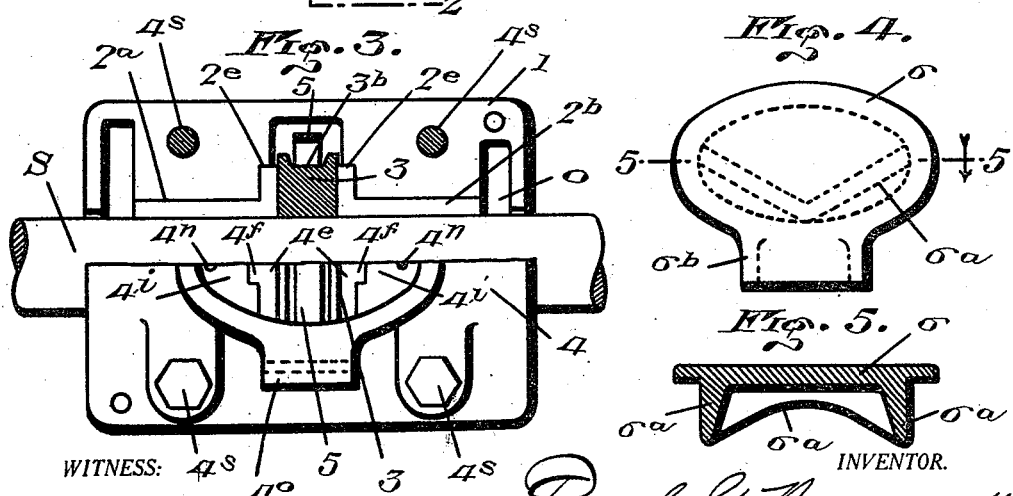

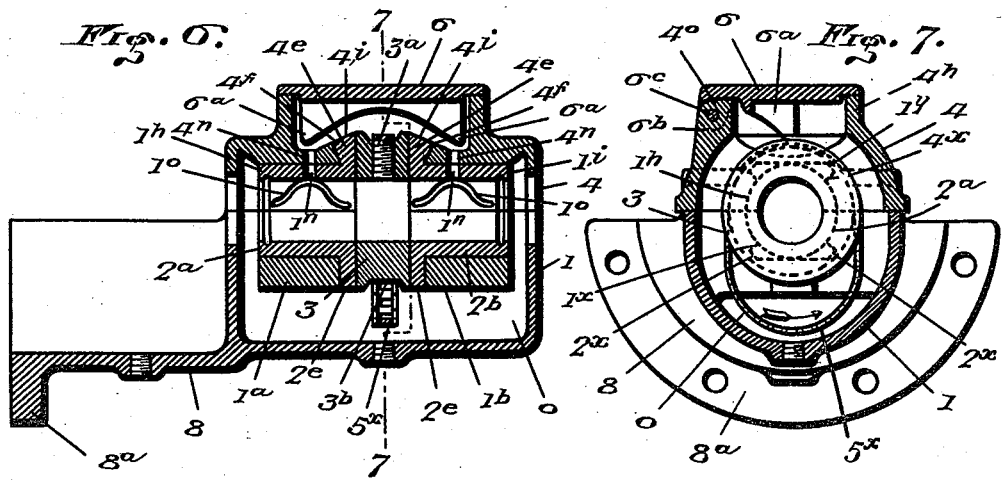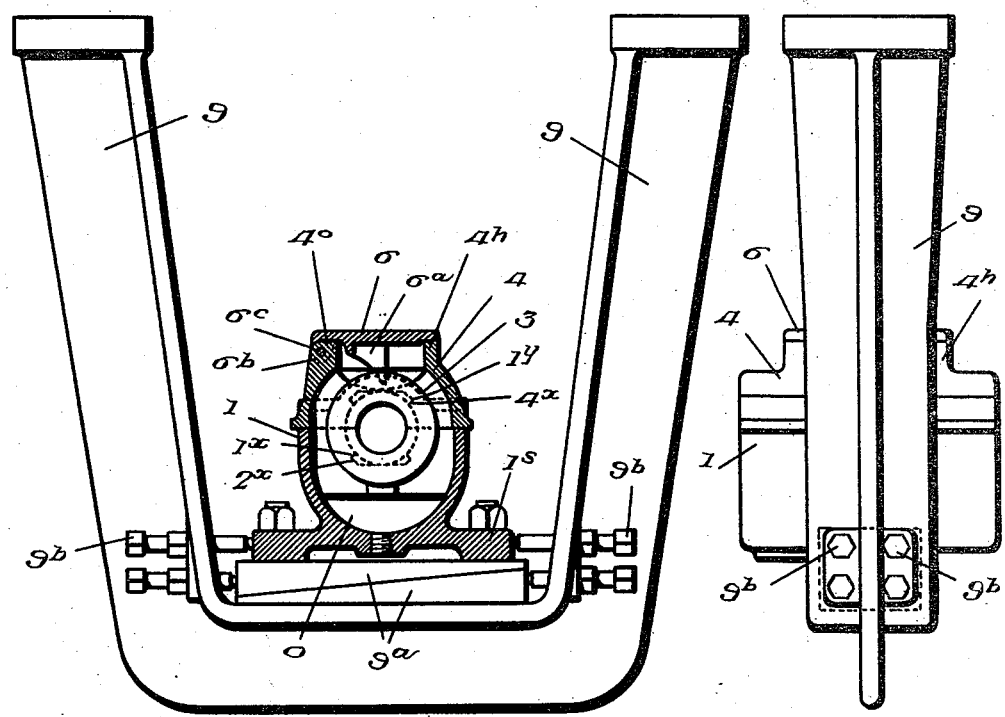

UNITED STATES PATENT OFFICE.

PAUL G. BOGDANOFF, OF BATTLE CREEK, MICHIGAN.

SPLIT LUBRICATING BEARING FOR SHAFTS, ETC.

1,421,661.   Specification of Letters Patent.   Patented July 4, 1922.

Application filed November 10, 1919. Serial No. 336,790.

*To all whom it may concern:*

Be it known that I, PAUL G. BOGDANOFF, a citizen of the United States, residing at Battle Creek, in the county of Calhoun and State of Michigan, have invented certain new and useful Improvements in Split Lubricating Bearings for Shafts, etc.; and I hereby declare that the following is a full, clear, and exact description thereof, reference being had to the accompanying drawings, which form part of this specification.

This invention is an improvement in self-lubricating journal boxes or bearings for shafts; and its object is to provide a novel journal box which may be mounted on a pedestal, a bracket, or a hanger; and to provide novel means whereby the bearing is self-lubricating; and whereby longitudinal play of the shaft in the bearing may be prevented and end thrust thereof nullified.

I will explain the invention with reference to the accompanying drawings which illustrate a practical embodiment thereof, and will enable others skilled in the art to manufacture and use the same; and in the claims I have set forth the essentials of the invention and the novel features of construction and novel combinations of parts for which protection is desired.

In said drawings:

Fig. 1 is a longitudinal sectional elevation of the journal box on the line of the shaft, such journal box being shown as supported on a pedestal.

Fig. 2 is a vertical section on the line 2—2, Fig. 1.

Fig. 3 is a partial top plan view and part section on the line 3—3 of Fig. 2.

Fig. 4 is a top plan view of the cover detached.

Fig. 5 is a sectional view of the cover on the line 5—5, Fig. 4.

Fig. 6 is a longitudinal section of one of the journal boxes mounted in a bracket.

Fig. 7 is a transverse section on the line 7—7, Fig. 6.

Fig. 8 is a transverse section of a journal box suspended in a hanger.

Fig. 9 is a side view of Fig. 8.

The journal box as shown is divided horizontally on the axial line of the shaft and the bearing surfaces are divided both longitudinally and transversely thus forming two upper and two lower sections or a four-part bearing proper.

As shown the casing of the journal box consists of a lower portion 1, which may be cast, if desired, integrally with the standard or support upon which the journal box is mounted, as in Figs. 1 and 2; or it may be cast integral with a bracket support, as in Figs. 6 and 7; or integral with a base which is attachable to the support or hanger in which the journal box is to be mounted, as in Figs. 8 and 9. In each instance the part 1 remains substantially the same. This part 1 is hollow and is provided with transverse bridge portions or arches $1^a$, $1^b$, which support the two lower sections $2^a$ and $2^b$ of the bushing in which the shaft S is journaled. The space or chamber O in the part 1 at the outer ends of and below the bridge members $1^a$, $1^b$, forms an oil chamber which is adapted to contain a lubricant.

Each bushing section $2^a$, $2^b$ is concaved on its upper side to fit the shaft S; and each is provided with an exterior rib $2^x$ adapted to engage a corresponding slot $1^x$ in its support, $1^a$ or $1^b$, to prevent the bushing section turning in such support. Each bushing section is also preferably provided at its inner end with flanges $2^e$, which flanges contact with opposite sides of a collar 3, which may be fastened to the shaft by a screw $3^a$, or secured thereon by other suitable means.

Fitted to and over the lower part 1 of the casing is a part 4, which is also provided with transverse bridges or arches $4^a$, $4^b$, corresponding in position with and respectively opposed to, bridges or arches $1^a$, $1^b$ of the part 1. The part 4 may be secured to part 1 by bolts $4^s$, and the parts 1 and 4 have registering recesses in their ends for the passage of the shaft. An opening is preferably formed in the upper side of the part 4, as indicated in the drawing, such opening being surrounded by a flange $4^h$, which is closed by a cover 6.

Fitted to the inner surfaces of the arches $4^a$, $4^b$ are bushing sections $1^h$, $1^i$, which correspond to the bushing sections $2^a$, $2^e$, and therewith form complete bushings around the shaft S. The bushing sections $1^h$, $1^i$ may be provided with ribs $1^y$, similar to the ribs $2^x$, engaging slots $4^x$ in the arches $4^a$, $4^b$. The bushing sections $1^h$, $1^i$ are also provided on their inner ends with annular flanges $4^e$ which bear against opposite sides of the collar 3.

The two right-hand end sections of the bearing and the bushings thereof are spaced apart from the left-hand end sections, and the thrust collar 3 is interposed between the opposed parts of the bearing and bushings, and any variation in end thrust can be taken care of by adjusting the collar.

The upper sections $1^h$, $1^i$ of the bushing preferably have their flanges $4^e$ centrally thickened, as at $4^f$, on their outer faces, and engage corresponding slots or notches in the adjacent edges of the arches $4^a$, $4^b$, as shown, which will facilitate properly assembling and positioning the bushing sections in the bearing and preferably the upper thickened parts of the flanges are tapered or beveled downwardly away from the upper part of the collar 3, as indicated in the drawing; and preferably also the upper surfaces of the arches $4^a$, $4^b$, (which extend across the opening in part 4) are also tapered or inclined away from the collar 3, as shown, and as indicated at $4^i$, (Figs. 1 and 6), so as to direct any oil or lubricant which may be introduced into the opening or raised into this opening by the collar 3 (or a ring or chain on said collar) to oil holes $4^n$ located at the lowest part of the inclines $4^i$. The oil holes $4^n$ communicate with holes $1^n$ in the bushing sections $1^h$, $1^i$; and the holes $1^n$ may communicate with curved channels $1^o$ in the bushing sections $1^h$, $i^i$, (as indicated in Fig. 6) so as to distribute the lubricant thoroughly onto the shaft within the bushing.

The collar 3 preferably has an annular groove $3^b$ in its exterior, the sides of such groove being beveled outwardly as shown, and hung upon this collar is a ring 5, of larger diameter than the collar, which depends into the lubricant chamber 0 in the part 1, and is adapted to carry the lubricant up on the collar into the opening in part 4, where it overflows and is directed to the openings $4^n$, and passes to the bearings. Any suitable devices for raising the lubricant may be employed; in Fig. 6 and Fig. 7, I have shown a chain $5^x$ instead of a ring.

If the shaft is rotated rapidly oil picked up by the ring will be thrown off, by centrifugal action, against the inside of the cover 6. This cover 6 is preferably provided with a depending flange $6^a$ on its under side, which flange is curved longitudinally as indicated in Fig. 4, and it is also narrow at its center and wider or deeper at its ends, as indicated in Figs. 1 and 6, so that any oil caught on this flange would naturally run by gravity down the inclined lower edge of the flange to opposite ends thereof and drop from such ends into the holes $4^n$; the ends of the flange being preferably arranged to terminate just above said holes $4^n$. The cover 6 should be made to fit the flange $4^h$ and close the opening in the part 4; and be suitably fastened thereto. As shown the cover may be provided with ears $6^b$ secured by a pin $6^c$ to an ear $4^o$ on the part 4.

The collar 3 is designed to act both as a thrust collar and oil thrower. The ring or chain on the collar picks up the oil in the chamber 0. Part of this oil is thrown from the chamber in the direction of rotation and against the upper side of the cover in the flange $6^a$ and such oil is directed to the holes $4^n$. Part of the oil will overflow the groove in the collar at the top thereof and pass down the inclined walls $4^i$ to the holes $4^n$; thence the oil passes around the shaft through the bearing and escapes back into the oil chamber.

If the bearing was used with a very slow running shaft the flange $6^a$ in the cover would not be necessary, but for fast running shafts this flange is very important.

The outer ends of the bushing members are preferably spaced from the outer end walls of the parts 1 and 4, as shown, so that any lubricant which may be exuded from the outer ends of the bearing may easily pass back into the lubricant chamber 0.

The particular means of supporting the bearing may be varied according to the use or position in which the bearing is to be employed. For instance the bearing can be mounted on a standard, as shown in Figs. 1 and 2; or on a bracket as shown in Figs. 6 and 7; or on a hanger, as shown in Figs. 8 and 9, by simply properly modifying the form of the lower part of the casing 1. This casing may be formed separately from its support or cast therewith, as desired. As shown in Figs. 1 and 2 the part 1 is cast integrally with a standard 7, which may be of any desired construction or form. As shown in Figs. 6 and 7 the part 1 is cast integral with a bracket member 8 projecting from one end of the part 1 and provided with a flange $8^a$ suitably perforated for the passage of retaining bolts by which the bracket and bearing can be fastened in position to a suitable support. As shown in Figs. 8 and 9, the part 1 may be provided with a base $1^s$, which may be adjustably mounted in a U-shaped hanger 9 of any suitable construction; and the base $1^s$ may be mounted on adjustable wedges $9^a$ in the hanger 9 and may be secured in adjusted position by means of bolts $9^b$.

Having described my invention what I claim is:

1. In a journal box, a casing divided longitudinally into upper and lower parts, each containing transverse bearing members to support sections of a bushing; the upper part having oppositely inclined portions and holes at the lowermost part of such inclined portions to direct oil to the bushing; a bushing divided longitudinally and transversely into four sections, each section being fitted to a corresponding bearing member of the casing, the bushing sections being spaced apart longitudinally; a shaft journaled in the bushing; and a collar on said shaft intermediate the transversely spaced bushing sections.

2. In a journal box having a casing divided longitudinally into upper and lower parts, each containing transverse bearing members to support sections of a bushing; the bearing members in the upper part being inclined on their upper faces and having openings at their lowermost portions communicating with the bushings to direct oil thereto; a bushing divided longitudinally and transversely into four sections, each section being fitted to a corresponding bearing member of the casing, the bushing sections being spaced apart longitudinally; a shaft journaled in the bushing; and a collar on said shaft intermediate the transversely spaced bushing sections.

3. In a journal box, a casing divided longitudinally into upper and lower parts, each containing two transverse bearing members to support sections of a bushing; a bushing divided longitudinally and transversely into four sections, each section being fitted to a corresponding bearing member of the casing, said bushing sections having flanges on their inner ends, the opposed flanges on the ends of the bushing sections being spaced apart; a shaft journaled in the bushing; and a collar on said shaft intermediate the flanged ends of the bushing sections.

4. In a bearing, a casing divided longitudinally into upper and lower parts, each containing two integral transverse bearing members; the bearing members of the upper part being inclined on their upper faces and having holes at their lower portions to direct oil to the shaft; a bushing divided longitudinally and transversely into four sections, each section being fitted to a corresponding bearing member of the casing; a shaft journaled in the bushing; and a thrust collar on said shaft intermediate the transversely spaced bushing sections.

5. In a journal bearing, a casing divided longitudinally into upper and lower parts, each containing two transverse bearing members to support sections of a bushing; the bearing members of the upper part being inclined on their upper faces and having openings at their lower portions to direct oil to the bushing; a bushing divided longitudinally and transversely into four sections, each section being fitted to a corresponding bearing member of the casing; said bushing sections having flanges on their inner ends, the opposed flanges on the ends of the bushing sections being spaced apart; a shaft journaled in the bushing; a grooved collar on said shaft intermediate the flanged ends of the bushing sections and an oil ring on said collar.

6. A journal box having an opening, bearing members projecting across said opening and having inclined portions with oil holes at their lower edges; with a cover for the opening having a depending longitudinally bent flange projecting over said inclined portions the lower edge of said flange being inclined so as to direct oil thrown on the flange onto the said inclined portions.

7. A journal box having an opening above the bearing and inclined portions projecting into the opening and holes for directing oil from such portions to the bearing; with a cover for the opening having a longitudinally bent depending flange, said flange being oppositely tapered to direct oil thrown on the flange to said inclined portions.

8. A journal box having a top section provided with an opening above the bearing, a tapered lubricant collecting surface projecting into the opening and a hole leading from said surface to the bearing; with a cover for the opening having a depending longitudinally bent flange the lower edge of which is inclined so as to direct oil thrown on the flange to said surface, substantially as described.

9. A journal box having a top section provided with an opening above the bearing and opposite lubricant collecting surfaces within said opening and holes leading from said surfaces to the bearing; with a cover for the opening having a longitudinally bent depending flange, the said flange being oppositely tapered toward its ends so that it will direct oil thrown on the flange to both of said surfaces.

10. In combination, a casing having a bearing therein and an opening above the bearing; a shaft journaled in said bearing; and lubricating collar on the shaft; the upper part of said casing having an inclined portion at the side of the collar; and a hole in the lower part of said inclined portion for the passage of oil to said bearing; with a cover closing the opening in the casing and provided with a bent tapered flange, the deepest part of said flange being adjacent the oil hole to direct oil from the flange into said hole.

11. In combination, a casing having a bearing therein and an opening above the bearing; a shaft journaled in said bearing; and a collar attached to the shaft; the upper part of said casing having inclined walls at opposite sides of the collar, and holes in the lower part of said walls for the passage of oil to said bearings; with a cover closing the opening in the casing and provided with a bent tapered flange, the deepest parts of said flange being adjacent the oil holes to direct oil from the flange into said holes; and means on said collar for raising the lubricant into said opening.

12. In combination, a casing having a split bearing therein and an opening above the bearing; a shaft journaled in said bearing; a lubricating collar attached to the shaft between the opposite transversely divided halves of the bearing, the upper section of the bearing having inclined walls at opposite sides of the collar; and holes at the lower part of said walls for the passage of the oil back to the shaft; with a cover closing the opening in the upper part of the casing and provided with a bent flange whose lower edge is beveled, the deepest parts of said flange approaching the oil holes to direct oil from the flange into said holes, substantially as described.

13. In a journal box, a casing divided longitudinally into upper and lower parts, each containing two transverse bearing members to support sections of a bushing; the bearing members in the upper part having inclined portions on their upper faces and holes at the lowermost parts of said inclined portions communicating with the bushings to direct oil thereto; a bushing divided longitudinally and transversely into four sections, each section being fitted to a corresponding bearing member of the casing, the bushing sections being spaced apart longitudinally; a shaft journaled in the bushing; and a collar on said shaft intermediate the spaced bushing sections; said upper part having an opening above the inclined portions of the bearing members; and a cover fitting said opening having a bent depending flange adapted to direct lubricant onto both of said inclined portions.

14. In a bearing, a casing divided longitudinally into upper and lower parts, each containing two transverse bearing members to support sections of a bushing; the bearing members of the upper part having inclined portions on their upper faces and holes at the lower parts of said inclined portions to direct oil to the bushing sections; a bushing divided longitudinally and transversely into four sections, each section being fitted to a corresponding bearing member of the casing, said bushing sections having flanges on their inner ends, the opposed flanges on the ends of the bushings being spaced apart; a shaft journaled in the bushing; and a thrust collar on said shaft intermediate the flanged ends of the bushing sections; said upper part having an opening above and surrounding the said inclined portions of the bearing members; and a cover fitting said opening having a bent depending flange adapted to direct lubricant onto said inclined portions.

15. In a journal box, a casing divided longitudinally into upper and lower parts, each containing two longitudinally spaced half sections of a bearing; a bushing section fitted to each bearing section, each bushing section having a flange on its inner end; the bearing sections in the upper part having inclined upper surfaces and holes at the lowermost ends of said inclined portions to direct oil to the bushing; the upper part of the casing having an opening above the said inclined portions of the bearings; and said lower part having an oil reservoir; a shaft journaled in the bearing; a collar on said shaft intermediate the flanged ends of the bushing sections; an oil raising member loosely suspended on said collar; and a cover fitting said opening having a bent depending flange adapted to direct lubricant to said inclined portions.

16. A journal box provided with an opening above the bearing, inclined surfaces projecting into the opening and holes leading from the surfaces to the bearing; a cover for the opening having a bent depending flange, the ends of said flange being oppositely tapered so that it will direct oil thrown on the flange to said surfaces, a shaft journaled in said bearings, a thrust collar on said shaft, and a lubricant raising element hung loosely on said thrust collar.

17. A journal box provided with inclined surfaces above the bearing and holes leading from said surfaces to the bearings, a cover for the opening having a depending flange adapted to direct oil thrown on the cover to said surfaces, a shaft journaled in said bearing, a grooved thrust collar on said shaft intermediate the inclined surfaces and an element loosely hung on said thrust collar adapted when the shaft is properly rotated to throw lubricant onto the cover and to also raise lubricant to the top of the groove in the collar whence it overflows onto said inclined surfaces, substantially as described.

In testimony that I claim the foregoing as my own, I affix my signature.

PAUL G. BOGDANOFF.